Feb. 17, 1953 J. M. MILLER ET AL 2,629,049

FILTER

Filed March 2, 1942 2 SHEETS—SHEET 1

Inventors
John M. Miller
Bernard Salzberg

By [signature]
Attorney

Feb. 17, 1953 J. M. MILLER ET AL 2,629,049

FILTER

Filed March 2, 1942 2 SHEETS—SHEET 2

Inventors
John M. Miller
Bernard Salzberg

By [signature]
Attorney

Patented Feb. 17, 1953 2,629,049

UNITED STATES PATENT OFFICE 2,629,049

FILTER

John M. Miller and Bernard Salzberg, Washington, D. C.

Application March 2, 1942, Serial No. 432,992

5 Claims. (Cl. 250—20)

(Granted under Title 35, U. S. Code (1952), sec. 266)

This invention relates to a novel filter means for use with receivers of radio echo distance measuring systems.

It is the practice in well designed broadcast and communication receivers to provide a band width of sensibly uniform response just wide enough to admit the significant frequency components of the desired signal. The object of such design is to cause the receiver to discriminate against frequency components of noise and interference which lie outside the useful frequency band required for the signal. Similarly a band width of sensibly uniform response has been customarily employed in the design of the receivers of radio echo distance measuring systems.

The usual radio signal, whether it be of the broadcast, communication or television variety is essentially a variable form of modulation, the instantaneous amplitude and frequency of which are constantly changing in an entirely unpredictable fashion. If a signal of this type is to be faithfully reproduced by a receiver the band width of the receiver must be sensibly uniform over the entire range of significant frequencies which the modulation is liable to encompass. The signal of the radio echo distance measuring device on the other hand consists of discrete and similar pulses which recur at a definite fixed rate. The video envelope of a signal of this type is equivalent to the sum of a direct current component and an infinite number of discrete steady state alternating current components. Adjacent components of this infinite sum are separated in the frequency spectrum by the pulse repetition rate. The amplitudes of the components are determined by the relative length and shape of the pulse. This difference in signal characteristics is the basis of the present invention.

It is an object of this invention to provide a novel means for improving the signal-to-noise and signal-to-interference ratios of radio echo receivers.

It is a further object to provide a novel filtering means responsive only to predetermined portions of a band of frequencies.

It is another object to provide a novel filtering means for receiving a signal composed of similar discrete pulses, which filtering means is fully responsive only to the significant components of the frequency spectrum of the pulse modulation, and as non-responsive as possible to all other frequencies.

Other objects will become apparent from a careful consideration of the following description when taken together with the accompanying drawings in which.

Figure 1:
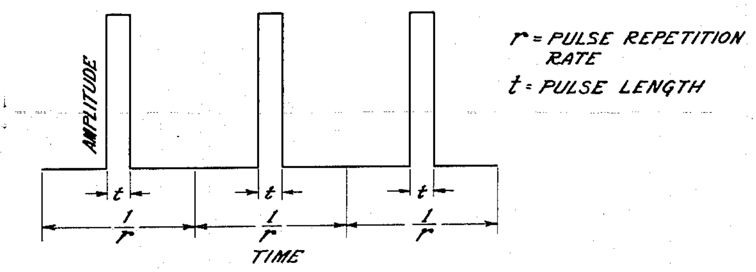
Fig. 1 is a diagram showing several cycles of a rectangular pulse modulation in terms of amplitude and time.

Fig. 1 illustrates several cycles of a rectngular pulse modulation. The rectangular form of the pulse shown can only be approximated in practice, since the instantaneous build-up and the discontinuities required by the corners cannot be completely realized. In this figure amplitude is plotted as a function of time. For purposes of illustration, it is assumed that the pulses recur at the rate of 1640 per second and that the length of the pulse is 61 microseconds.

Figures 2, 3:
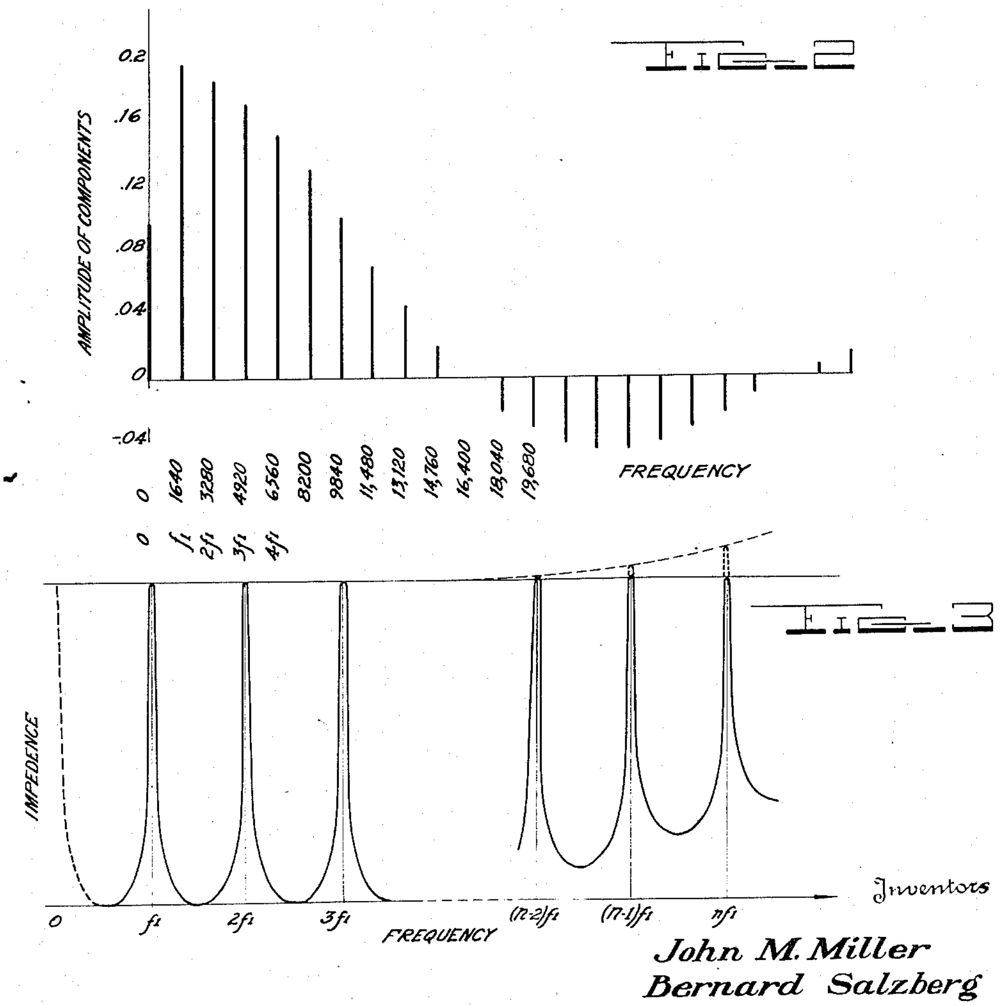
Fig. 2 is a diagram showing the frequency spectrum of the type of pulse modulation illustrated in Fig. 1.
Fig. 3 is a diagram showing a typical impedance versus frequency characteristics of the filter means.

Fig. 2 shows the corresponding frequency spectrum of this pulse modulation. In this figure the amplitudes of the frequency components are plotted as a function of frequency. It will be observed that the components which are present occur at frequencies $f=0$, 1640, 3280, 4920, 6560, . . . cycles per second, and that the amplitudes of the high frequency components are small relative to the amplitudes of the low frequency components. Because of this latter fact it is possible to obtain a reasonably faithful replica of the original signal by means of a band width of finite magnitude.

Fig. 2 makes evident the fundamental difference between the modulation frequency spectrum of the usual radio signal and that of a radio echo distance finding transmitter commented upon above and upon which this invention is based, namely, that the radio echo signal is a synthesis of discrete and constant frequency components within a band, whereas the usual radio signal is a synthesis of various and variable frequencies within a band.

The present invention makes use of this fundamental difference to improve the signal-to-noise ratio and the signal-to-interference ratio of a radio echo receiver by passing the demodulated incoming signal through a video filter which is fully responsive only at the significant discrete frequencies of which the signal modulation is composed and is as non-responsive as possible at all other frequencies. This results in discrimination against the frequency components of noise and interference which fall between the frequency components of the desired signal without impairing the signal itself in any way. In effect the requisite band width as regards the signal is preserved, but the band width as regards noise and interference is considerably reduced.

Fig. 3 illustrates an impedance versus frequency curve of the desired form for a pulse modulation having a frequency spectrum of the type illustrated in Fig. 2. It will be noted that impedance maxima occur at each of the frequency components whose amplitudes are most significant, namely the group of components which appear on the left hand side of Fig. 2. These maxima may be of equal value. However, it is sometimes desirable to have the maxima increase with frequency, as indicated by the upper dotted line, as it has been found that this tends in some cases to give the received signal a shape more nearly that of the ideal rectangular pulse form. The dotted impedance maximum which occurs at zero frequency is not essential for purposes of reproducing the pulse modulation, and may be omitted when it is not desired to preserve the direct current component.

Figure 4:
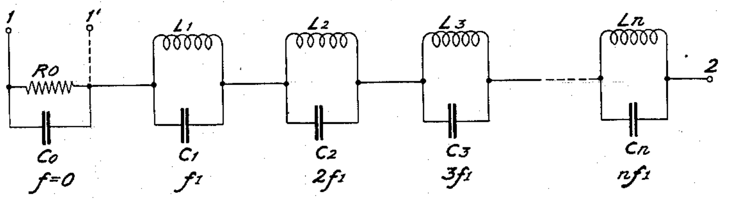
Fig. 4 is a circuit diagram of a typical filtering means embodying the invention.

Fig. 4 illustrates by way of example one video filter arrangement embodying the invention. It consists of a series chain of individual circuits each of which is fully responsive to one of the frequency components of the pulse modulation. Applicants are fully aware that numerous filtering arrangements satisfying the requirements of the invention may be constructed by those skilled in the art. The one illustrated is purely by way of example. In the arrangement shown the direct current component is built up across the circuit which contains resistance $R_0$ and capacitance $C_0$ in parallel, while the fundamental component is built up across the anti-resonant circuit which is tuned to the pulse repetition rate, being made up of inductance $L_1$ and capacitance $C_1$. The other components are built up across the other anti-resonant circuits as indicated by the frequency designation below each circuit. The values of the component parts are fixed in such a way as to give an impedance versus frequency graph such as that shown in Fig. 3.

Many other filter arrangements embodying the invention will at once be suggested to those skilled in the art. For example, such arrangements may readily be derived by employment of known methods of network design which may be found discussed in standard textbooks. By this means, once the desired characteristics of a filter are known, its realization in a number of physical forms may easily be achieved and the proper values for its components readily calculated. Also an artificial electrical or mechanical transmission line which is substantially fully responsive only at the discrete frequency components of the pulse modulation may be employed. Further, the filter may consist of combinations of electrical and mechanical elements arranged to produce the object of the invention. It should be pointed out that while the filter means described has been indicated as a video filter, it is possible, though probably less practical, to accomplish the object of the present invention by providing a multi-pass band filter in the R. F. or I. F. parts of a receiver.

Figure 5:
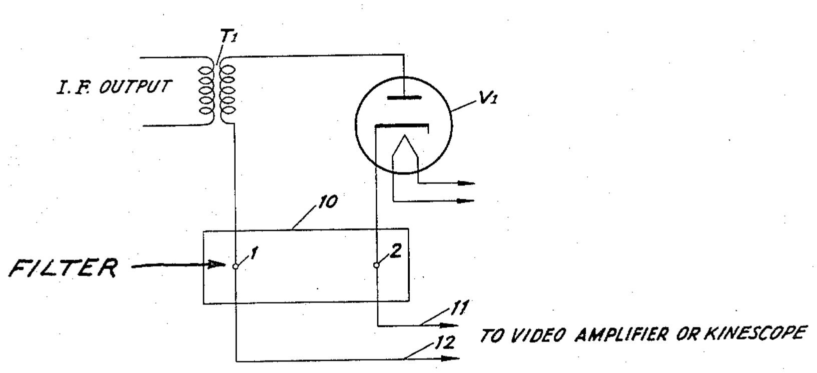
Fig. 5 is a schematic circuit diagram showing the filtering means of Fig. 4 used as the load circuit of a diode detector.

Fig. 5 illustrates by way of example the use of a filter embodying the invention as the load circuit of a detector. As shown, the detector comprises a conventional diode rectifier tube $V_1$ to which input voltage is supplied through transformer $T_1$. The filter shown in block form and indicated generally by reference character 10 is connected across the output leads 11 and 12 to complete the plate cathode circuit of the tube. The terminal 1 of the filter is shown connected to lead 12 while terminal 2 is connected to lead 11. The operation of this circuit arrangement is similar to that of the usual detector circuit arrangements except that the output video voltage is no longer sensibly uniform over the video frequency spectrum but is now fully responsive only at the significant discrete frequencies of which the pulse modulation is composed and is essentially non-responsive at all other frequencies.

Figure 6:
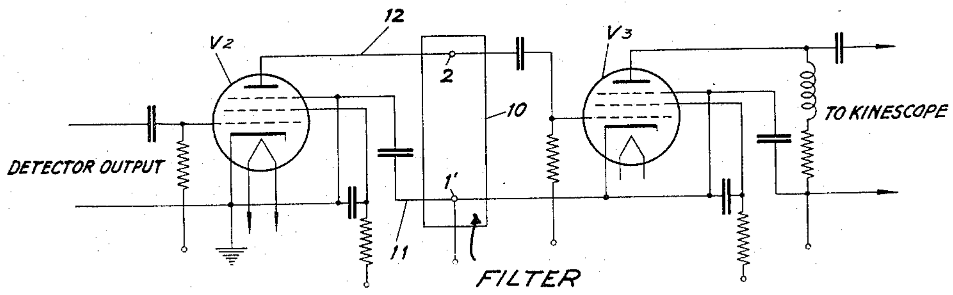
Fig. 6 is a schematic circuit diagram showing the filtering means of Fig. 4 used as an interstage coupling in a typical video amplifier.

Fig. 6 illustrates by way of example the use of a filter embodying the invention as the load circuit of the video amplifier. The amplifier is shown as comprising two cascaded amplifier tubes $V_2$ and $V_3$, the filter 10 being connected across the plate and cathode output leads 12 and 11 of tube $V_2$. The terminal 2 of the filter is connected to the plate lead while the terminal 1' is connected to the cathode lead. The portion of the filter responsive to direct current is omitted in this instance. The operation of this amplifier arrangement is similar to that of the more usual amplifier arrangements except that the output video voltage is no longer sensibly uniform over the video frequency spectrum but fully responsive only at the significant discrete frequencies of which the pulse modulation is composed and is essentially non-responsive at all other frequencies.

While only one embodiment of the invention has been illustrated and described, it should be distinctly understood that the invention is not limited thereto, since as pointed out above, many filter arrangements embodying the invention may be constructed.

The invention described herein may be manufactured and used by or for the Government of the United States of America for governmental purposes without the payment of any royalties thereon or therefor.

We claim:

1. A filter for use in the reception of a signal comprising a regular series of discrete radio pulses of uniform characteristics, the modulation frequency spectrum of which is made up of a direct current component, a fundamental alternating current component having a frequency equal to the pulse repetition rate and an infinite number of alternating current components having frequencies which are harmonics of the fundamental component; said filter comprising a plurality of filter components arranged in series, one of said elements comprising a resistance and a condenser in parallel and each of the remaining elements comprising an anti-resonant circuit tuned to one of the said alternating current components.

2. Means for receiving a radiated signal comprising a regular series of discrete radio frequency pulses with a high degree of discrimination against noise and interference, which comprises means for demodulating said signal, a transmission channel receiving the demodulated signal, means shunting the transmission channel presenting to the demodulated signal components a frequency selective impedance which is high with respect to each of a selected multiplicity of significant components of the frequency spectrum of the demodulated pulse signal and low with respect to every other frequency, and terminal signal utilization means receiving said signal only from said channel.

3. Means for receiving a radiated signal comprising a regular series of discrete similar radio frequency pulses with a high degree of discrimination against noise and interference, which comprises means for demodulating said signal, a transmission channel receiving the demodulated signal, means shunting the transmission channel presenting to the demodulated signal components a frequency selective impedance which is at a uniform maximum with respect to each of a selected multiplicity of significant components of the frequency spectrum of the demodulated pulse signal and which is low with respect to every other frequency, and terminal signal utilization means receiving said signal only from said channel.

4. Means for receiving a radiated signal comprising a regular series of discrete similar radio frequency pulses with a high degree of discrimination against noise and interference, which comprises means for demodulating said signal and means shunting the transmission channel presenting to the demodulated signal components a frequency selective impedance which is at a maximum with respect to each of a selected number of significant components of the frequency spectrum of the demodulated pulse signal and low with respect to every other frequency, the value of the impedance presented to the respective components increasing with the frequency of the component.

5. A receiver for receiving a radiated signal consisting of a regular series of discrete similar pulses, said receiver comprising a detector, an output circuit and means shunting said output circuit for discriminating against noise and interference, said means consisting of a filter presenting a high impedance to a multiplicity of frequencies which are multiples of the repetition rate of said pulses and a low impedance to all other frequencies.

JOHN M. MILLER.
BERNARD SALZBERG.

REFERENCES CITED

The following references are of record in the file of this patent:

UNITED STATES PATENTS

| Number | Name | Date |
|---|---|---|
| 1,530,498 | Kendall | Mar. 24, 1925 |
| 1,828,454 | Bode | Oct. 20, 1931 |
| 1,955,788 | Bode | Apr. 24, 1934 |
| 2,018,540 | Wheeler | Oct. 22, 1935 |
| 2,149,077 | Vance | Feb. 28, 1939 |
| 2,200,036 | Mountjoy | May 7, 1940 |
| 2,255,839 | Wilson | Sept. 16, 1941 |
| 2,269,011 | Dallos | Jan. 6, 1942 |
| 2,299,571 | Dome | Oct. 20, 1942 |
| 2,416,424 | Wilson | Feb. 25, 1947 |